United States Patent [19]
Deshores

[11] 3,762,763
[45] Oct. 2, 1973

[54] COVER FOR OPEN BED VEHICLES
[75] Inventor: Robert E. Deshores, San Pedro, Calif.
[73] Assignee: Lock Top Corporation, Gardena, Calif.
[22] Filed: Nov. 22, 1971
[21] Appl. No.: 200,916

[52] U.S. Cl. ............................................. 296/137 B
[51] Int. Cl. ................................................ B60j 7/10
[58] Field of Search ...................... 296/137 B, 100; 49/130; 312/138

[56] References Cited
UNITED STATES PATENTS
| 3,649,072 | 3/1972 | Cross | 296/137 B |
| 2,853,380 | 9/1958 | Hershberger | 296/137 B |
| 2,086,091 | 7/1937 | Payette | 296/100 |

FOREIGN PATENTS OR APPLICATIONS
| 470,712 | 3/1937 | Great Britain | 49/130 |

Primary Examiner—Benjamin Hersh
Assistant Examiner—Robert R. Song
Attorney—Finkelstein & Mueth

[57] ABSTRACT
A detachable cover for open bed vehicles such as pickup trucks or the like. A pair of track means are coupled to the top of each of the truck sides and extend substantially the length of the bed from the cab of the vehicle to the tail gate. Each track means has an upper track and a lower track and transition slots therebetween. A forward planar rectangular panel is removeably mounted for sliding movement in the upper track and is positionable adjacent the cab and extends approximately half the distance from the cab to the tail gate. Means are provided to prevent the forward panel from passing through the slots to the lower track. The rear panel is also planar and rectangular and is removeably and slideably mounted in the track means. When the rear panel is in the upper track it extends from the rear edge of the forward panel to the tail gate. In this closed position, the two panels are substantially coplanar and coextensive with the bed of the vehicle and cover the storage area of the vehicle. The rear panel can also move through the transition slots between the upper track and the lower track and, moving in the lower track, to a position adjacent the cab and substantailly coextensive with the forward panel for providing access to the storage volume. The panels may be locked in a plurality of positions, at least one of the plurality being the closed position to lock the storage volume. Locking of the tail gate to the to the rear panel provides a locked storage volume. Gasketing in included to provide a substantially water tight engagement of the structure with the vehicle.

10 Claims, 13 Drawing Figures

PATENTED OCT 2 1973 3,762,763

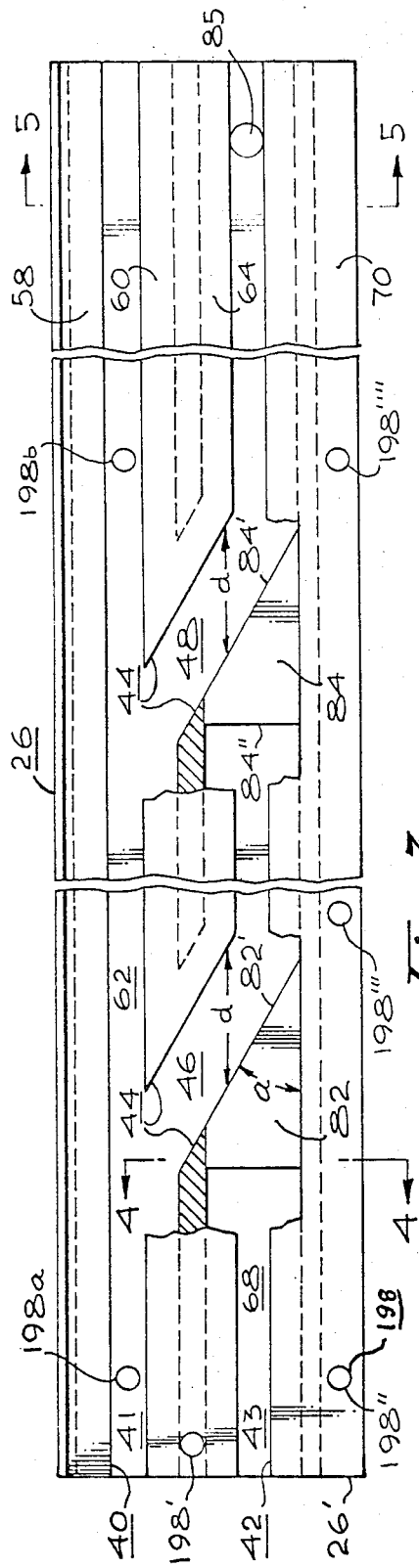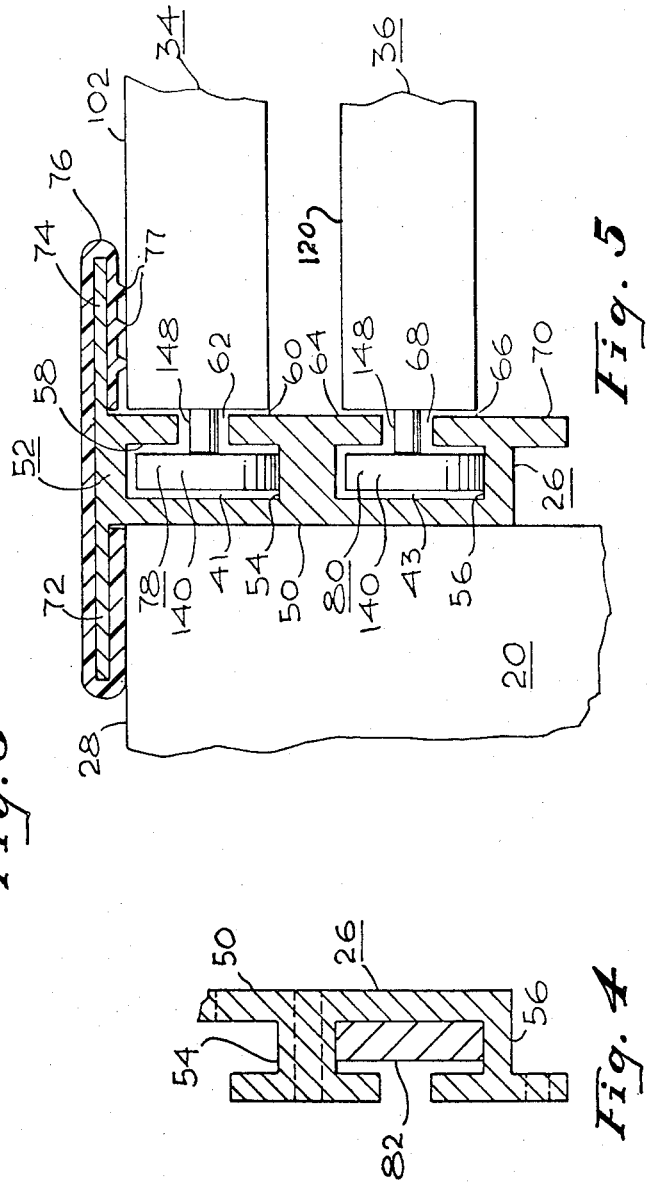

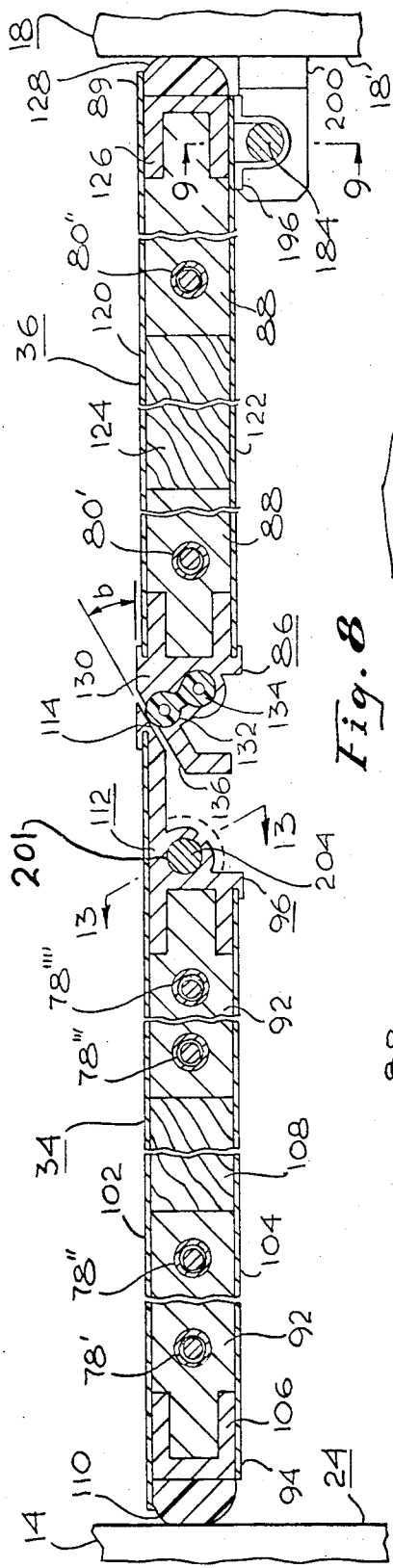

COVER FOR OPEN BED VEHICLES

BACKGROUND OF THE INVENTION

1. Field of the Invention

This invention relates to slideable covers and more particularly, to a slideable cover arrangement for vehicles of the type having an open bed, such as pickup trucks or the like.

2. Description of the Prior Art

In the utilization of open bed vehicles, such as pickup trucks or the like, it is often desirable to provide a cover arrangement for the open bed of such vehicles in order to enclose the storage volume. Preferably, such a cover should be easily manually operable and removeably mounted on the pickup truck so that for those applications where it is not needed, it may be quickly and easily removed therefrom to allow utilization of the pickup truck with an open bed. Further, it is often desired for such covers to provide a comparatively low wind resistance when installed in order to provide greater economy of operation of the vehicles.

Additionally, locking means are often also desired with such a removeable cover arrangement so that the entire storage volume of the vehicle may be locked when the covers are in place and such locking means also, preferably, locks the tail gate in the up position so that access to the storage volume thus enclosed remains secure.

In general, these desiderata have not been achieved in the cover structures utilized in the prior art. For example, in many such cover arrangements, the covers were not conveniently or easily removed after installation on the vehicle. In others, the cover, when in the extended and locked position, was not a substantially planar assembly for minimizing wind resistance.

In those of the prior art cover structures in which telescoping members were utilized, they have generally not proven to be acceptable for all applications.

BRIEF DESCRIPTION OF THE INVENTION

Accordingly, it is an object of the present invention to provide an improved cover arrangement for open bed vehicles.

It is another object of the present invention to provide a manually operable removeable cover for open bed vehicles.

It is yet another object of the present invention to provide a cover arrangement for open bed vehicles in which the cover, when in an extended position for substantially enclosing the bed of the vehicle, provides a planar upper surface to minimize wind resistance and may be locked in that position to prevent unauthorized access to the storage volume enclosed.

The above and other objects of the present invention are achieved by providing a pair of generally E-shaped track means defining an upper and a lower track mounted in parallel relationship on the top edges of opposite sides of the open bed truck extending from the cab to the tail gate. A substantially rectangular planar forward panel is resiliently mounted on wheel means and the wheel means mount the forward panel in the upper of the two tracks provided by the E-shaped track means. The panel may be slideably removed from the upper track as desired and is positionable in the track means adjacent the cab and extends approximately half the distance to the tail gate. A substantially rectangular planar rear panel is also removably mounted in the track means on resiliently mounted wheel means and positionable in the upper track means adjacent the tail gate and extends to the rear edge of the forward panel to enclose the storage volume in a closed condition.

The rear panel is also movable from the upper track through transition slots between the upper track and lower track to the lower track. The rear panel may be positioned, while in the lower track, adjacent the cab and under the forward panel in an open condition to allow easy access to the storage volume.

The ends of the E-shaped track means adjacent the tail gate are open to allow installation and removal of the panels therebetween when the tail gate is in the open position.

The panels are preferably light in weight, since they are manually operated but also must be sufficiently rigid to withstand the intended use. Accordingly, the forward and rear panels are similarly constructed of an upper and lower skin with honeycomb bonded therebetween. A channel means extends around the peripheral edges of the panel. The top surfaces of the panels are planar and, in the closed position, provide a substantially coplanar configuration for minimizing drag.

Locking means are also provided for locking the forward and rear panels to the track means in a plurality of positions including at least the open condition and the closed condition.

Since the sides of the open bed truck may often be bowed or otherwise non-parallel, the wheel means on the forward and rear panels are resiliently mounted thereon to allow inward and outward movement thereof with respect to the panels to accommodate such misalignment.

Gasketing is provided so that a water tight sealing relationship is achieved for the structure protecting the storage volume and/or the contents thereof.

BRIEF DESCRIPTION OF THE DRAWINGS

FIG. 3 illustrates, partially in section, a track means useful in the practice of the present invention;

FIG. 4 is a sectional view taken along the line 4—4 of FIG. 3;

FIG. 5 is a sectional view taken along the line 5—5 of FIG. 3;

FIG. 8 is a sectional view taken along the line 8—8 of FIG. 2;

FIG. 9 is a sectional view taken along the line 9—9 of FIG. 8;

FIG. 10 illustrates a mounting arrangement useful in the practice of the present invention;

FIG. 11 is a sectional view taken along the line 11—11 of FIG. 10;

FIG. 12 is a view taken along the line 12—12 of FIG. 1; and

FIG. 13 is a sectional view taken along the line 13—13 of FIG. 8.

DETAILED DESCRIPTION OF THE INVENTION

Figure 1:
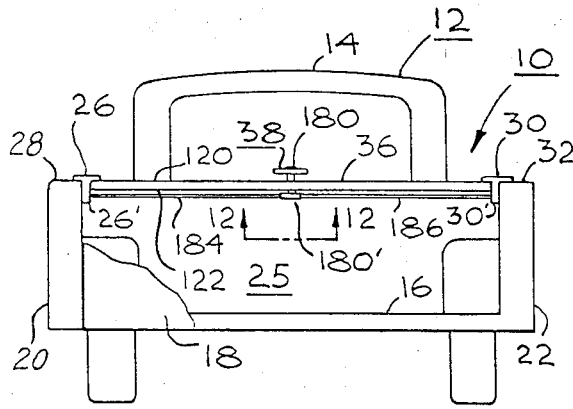
FIG. 1 and FIG. 2 illustrate a pickup truck provided with the improved cover according to the principles of the present invention.
Figure 2:
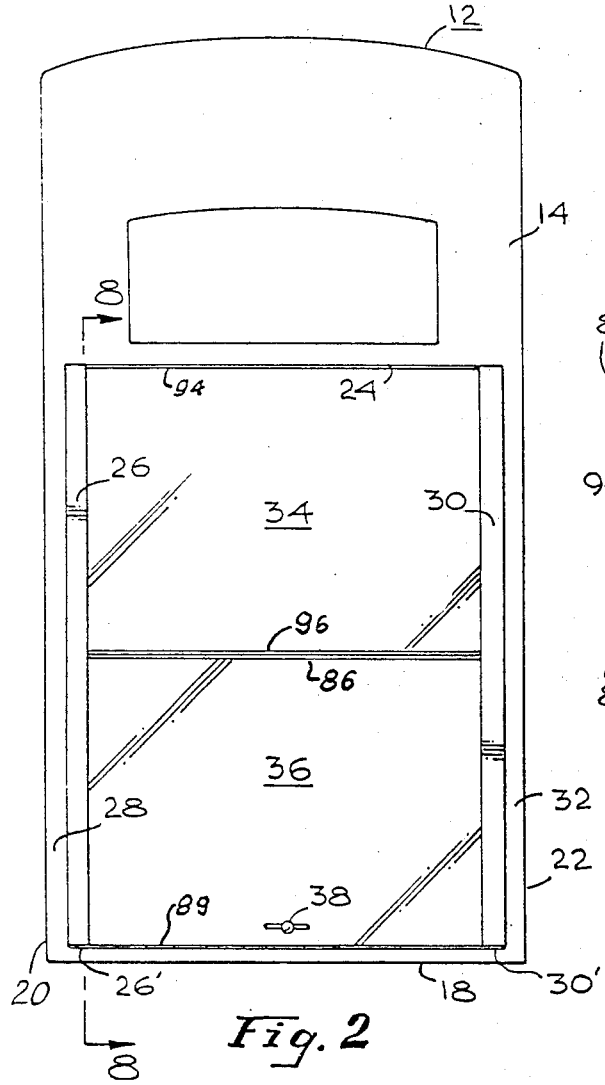

Referring now to FIGS. 1 and 2, there is shown one embodiment of the present invention and generally designated 10 that is utilized in an open bed vehicle 12 which, for example, may be a pickup truck. The open bed vehicle 12 has cab 14, a base 16 coupled to the cab and a tail gate 18 pivotally mounted on the base 16 and spaced from the cab 14. The open bed vehicle 12 also has a first upstanding side wall member 20 coupled to the base 16 and a second upstanding side wall member 22 coupled to the base 16. The rear wall 24 of the cab 14 together with the tail gate 18, base 16 and side walls 20 and 22 define a storage volume 25 so that articles may be stored therein and the cover locked in a plurality of positions, at least one of the plurality of positions comprising a closed condition providing a substantially planar cover array locked to the side walls 20 and 22 and locking the tail gate 18 in its closed position.

The present embodiment 10 generally comprises a first track means 26 coupled to an upper edge 28 of the first side wall 20 and a second track means 30 coupled to an upper edge 32 of the second side wall 22. The first track means 26 and second track means 30 are substantially identical and are described below in greater detail.

A forward panel 34 is slideably and removably mounted in the track means 26 and 30 and extends from the rear wall 24 of the cab 14 to a rear edge 96 thereof positioned intermediate the rear wall 24 and the tail gate 18. A rear panel 36 is removably and slideably mounted in the track means 26 and 30 and, for the position shown in FIG. 2, extends from the rear edge 96 of the forward panel 34 to the tail gate 18. This position of the forward panel 34 and rear panel 36 may be considered a closed condition for the embodiment 10.

The rear panel 36 is provided with a lock means 38 for locking the rear panel 36 in the closed position. The lock means 38 is described below in greater detail.

Referring now to FIGS. 3, 4 and 5, there is illustrated the track means 26 which, as noted above, is substantially identical to the track means 30. As shown, the track means 26 has first walls 40 defining an upper track 41, second walls 42 defining a lower track 43 and third walls 44 defining a first transition slot 46 and a second transition slot 48. The transition slots 46 and 48 have a preselected width indicated by the letter *d* on FIG. 3, and are spaced a preselected distance apart and a preselected distance from the open end 26'. The first track means 26 and second track means 30 are, of course, in substantially parallel relationship with each other when mounted on the side members 20 and 22, respectively, and extend from the rear wall 24 of the cab 14 to the tail gate 18.

As shown more particularly in FIG. 5, the track means 26 is generally E-shaped and has a vertically disposed side portion 50, a top flange portion 52, a middle flange portion 54 and a lower flange portion 56. The top flange portion 52 and middle flange portion 54 define the upper track 41. The middle flange portion and lower flange portion 56 define the lower track 43. The upper flange portion 52 is provided with the first walls 58 extending from the first flange 52 a preselected distance towards the middle flange 54. The first wall 58 is substantially parallel to the side portion 50 and is spaced therefrom. The middle flange 54 has a second wall 60 extending upwardly substantially coplanar with first wall 58 and define a first gap 62. The middle flange 54 is also provided with a third wall 64 extending vertically downward substantially parallel to the side portion 50 a preselected distance towards the lower flange 56. The lower flange 56 has a fourth wall 66 extending vertically upwards towards the third wall 64. The third wall 64 and fourth wall 66 are substantially coplanar and define a second gap 68 therebetween. The lower flange 56 is also provided with a fifth wall 70 extending vertically downwards from the lower flange 56 a preselected distance.

The upper flange 52 is also provided with a first horizontally disposed portion 72 that extends outwardly over the top edge 28 of the side member 20 and a second horizontally disposed portion 74 extending a preselected distance inwardly over the forward panel 34 and rear panel 36. A track gasket means 76 is coupled to the upper flange 52 and provides water tight sealing between the track means 26 and the upper edge 28 of the side member 20, and water tight sealing between the upper surface 102 of the forward panel 34 and, as described below in greater detail, between the upper surface 120 of the rear panel 36 by means of the protuberances 77 for the condition of the rear panel 36 in the closed position as illustrated in FIGS. 1 and 3.

The forward panel 34 has mounting means 78 that are slideably mounted in the upper track 41 and the forward panel 34 is also provided with restraining means, described below in greater detail, for restraining the upper panel 34 in the upper track 41 and preventing the mounting means 78 from entering the transition slots 46 and 48. This prevents the forward panel 34 from entering the lower track 43.

The rear panel 36 is slideably mounted in the track means 26 and 30 by the mounting means 80. The mounting means 80 are similar to the mounting means 78 and is positioned in the upper track 41 upon installation of the rear panel 36 in the track means 26 and 30. The rear panel 36 may move towards the cab 14 until the mounting means 80 encounter the transition slots 46 and 48. Mounting means 80 pass through the transition slots 46 and 48 for positioning the rear panel 36 in the lower track 43. When in the lower track 43 it may be moved forwardly toward the rear wall 24 of the cab 14 and be in substantial coextensive position under the forward panel 34. This position may be called an open condition.

To aid in the transfer of the rear panel 36 from the upper track 41 to the lower track 43, in preferred embodiments of the present invention, guide block means 82 and 84, FIGS. 3 and 4, are positioned on the track means 26 in the lower track 43 thereof. The slanting face 82' and 84' of the guide block means 82 and 84, respectively, allow a smooth transition of the mounting means 80 from the upper track 81 to the lower track 43 and return. As shown in FIG. 3, in preferred embodiments of the present invention, the transitions slots 46 and 48 slant downwardly and forwardly from the upper track 41 to the lower track 43 and the angle of the walls 44 is preferably on the order of 30°, as indicated by the letter *a* on FIG. 3.

Figure 6:
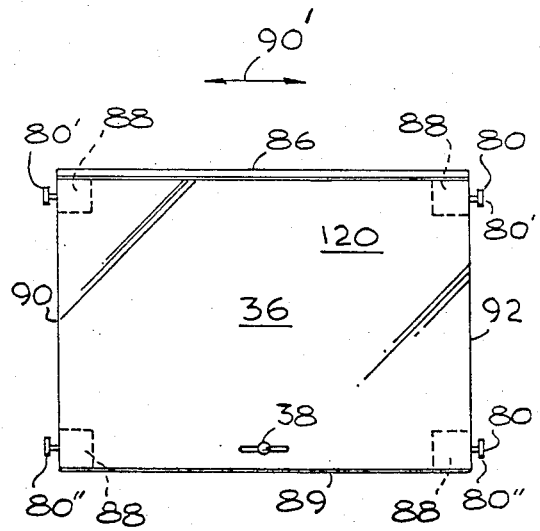
FIG. 6 is a plan view of a rear panel useful in the practice of the present invention.

Referring now to FIG. 6, there is shown a plan view of the rear panel 36. As shown, the rear panel 36 is substantially rectangular and has a forward edge 86, a rear edge 89 and a pair of sides edges 90 and 92. The rear panel 36 is provided with rigid block means 88 at each corner thereof and the mounting means 80 are resiliently coupled thereto for resiliently allowing lateral movement of the mounting means 80 with respect to the panel 36 in the directions indicated by the double-ended arrow 90' as may be caused by, for example, slight bowing of the side members 20 and/or 22, which, in turn, would bow the track means 26 and 30. As described below in greater detail, the mounting means 80 provides for a resilient and extendable mounting to allow for such non-linearity. The mounting means 80 generally comprise a pair of forward wheel means 80' and a pair of rear wheel means 80''. The forward wheel means 80' may be spaced the preselected distance form the pair of rear wheel means 80'' corresponding to the separation between the transition slots 46 and 48 in the track means 26 and 30. Alternatively, in some embodiments, the spacing betweeen the forward wheel means 80' and rear wheel means 80'' may be slightly greater than the spacing between the slots 46 and 48 so that the forward wheel means 80' enters slot 48 just before the rear wheel means 80'' enters slot 46. Thus, when the rear panel 36 is moved in the upper track 41 the forward wheel means 80' may enter the forward transition slot 48 at the same time as the rear wheel means 80'' may enter the rear transition slot 46. In either embodiment, the rear panel 36 is thus lowered into the lower track 43.

Figure 7:
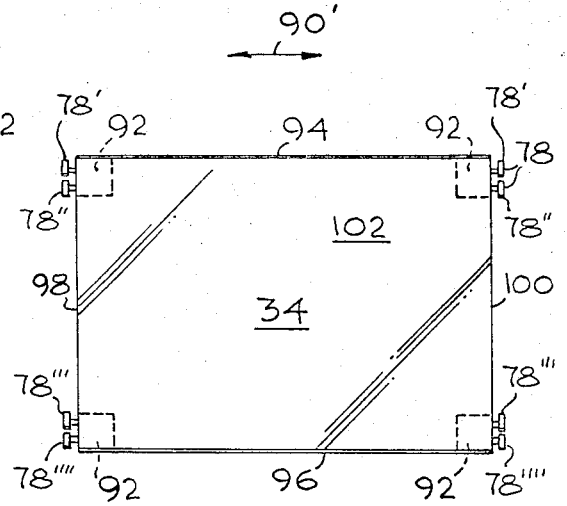
FIG. 7 is a plan view of a forward panel useful in the practice of the present invention.

FIG. 7 illustrates the forward panel 34 and, as shown thereon, the forward panel 34 is also substantially rectangular and is provided with rigid block means 92 at each corner thereof. The rigid block means 92 are similar to the rigid block means 88 in the rear panel 36 and the mounting means 78 of the forward panel 34 are resiliently coupled therein. The forward panel 34 has a forward edge 94, a rear edge 96 and a pair of side edges 98 and 100.

The mounting means 78, in the preferred embodiment of the present invention, comprise a first pair of forward wheel means 78' mounted in the blocks 92 and a second pair of forward wheel means 78'' mounted in the rigid blocks 92. The spacing between the first pair of forward wheel means 78' and the second pair of forward wheel means 78'' is greater than the preselected width d of the transition slots 46 and 48. The mounting means 78 also comprises a first pair of rear wheel means 78''' resiliently mounted in the rigid block means 92 and a second pair of rear wheel means 78'''' resiliently mounted in the rigid blocks 92. The spacing between the first pair of rear wheel means 78''' and the second pair of rear wheel means 78'''' on the rear panel 34 is also greater than the preselected distance width d of the transition slots 46 and 48. Each of the wheel means 78', 78'', 78''', and 78'''' of the forward panel 34 and the wheel means 80' and 80'' of the rear panel 36 are substantially identical and their construction is described below. The mounting means 78 in the forward panel 34 is also resiliently mounted in the forward panel 34 for allowing lateral movement of the mounting means 78 with respect to the forward panel 34 in the direction indicated by the double ended arrow 90' for the reasons as discussed above in connection with the rear panel 36.

FIG. 8 is a sectional view taken along the line 8—8 of FIG. 2 and illustrates a preferred construction for the forward panel 34 and the rear panel 36. It will be appreciated that, as noted above, the forward panel 34 and rear panel 36 are preferably light in weight to allow easy installation and removal thereof from the track means 26 and 30 as well as comparatively easy movement when sliding in the track means from one position to another. Thus, the construction of the forward panel 34 and rear panel 36 are substantially similar except for the differences noted. The forward panel 34 is provided with an upper skin means, which, for example, may be a thin sheet metal skin, generally designated 102 and a spaced apart lower skin means 104, which may also be a thin sheet metal skin. A channel means 106 extends around the forward edge 94, side edges 98 and 100 and rear edge 96. A lightweight honeycomb structure 108 is coupled to and is intermediate the upper skin 102 and lower skin 104 in preselected portions generally comprising all of the area therebetween except for the portions occupied by the rigid blocks 92. The rigid blocks 92 may be fabricated from any rigid material such as lightweight aluminum, wood or the like.

A cab gasket 110 is coupled to the channel 106 along the forward edge 94 and provides a water tight sealing relationship with the rear wall 24 of the cab 14 for the closed condition.

The channel means 106 extending along the rear edge 96 of the forward panel 96 has an extended portion 112 provided with a sealing edge 114 extending between the sides edges 98 and 100. As described below, the edge 114 cooperates in providing a water tight sealing relationship between the forward panel 34 and the rear panel 36 in the closed condition. The sealing edge 114 is preferably at an angle generally indicated by the letter b on FIG. 8 which is preferably on the order of 30°.

The rear panel 36 is constructed in a manner similar to the forward panel 34 and is generally comprised of an upper skin means 120, a lower skin means 122 spaced therefrom and a honeycomb structure 124 coupled to and intermediate the upper skin 120 and lower skin 122 in substantially all areas therebetween except the areas occupied by the rigid block means 88. The rear panel 36 is also provided with a channel means 126 extending around the rear edge 89, side edges 90 and 92 and forward edge 86 thereof.

A rear gasket 128 is coupled to the channel means 126 along the rear edge 89 and extending between the side edges 90 and 92. The rear gasket 128 engages the tail gate 18 to provide a water tight sealing relationship therewith when the tail gate 18 is closed and the forward panel 34 and rear panel 36 are in the closed position.

The channel means 126 extending along the forward edge 86 of the rear panel 36 is provided with an extension 130 having walls 132 therein defining a gasket receiving aperture. A gasket 134 is positioned in the gasket receiving aperture and extends above edge 136 on the extension 130 between the side walls 86 and 89 for water tight sealing engagement with the sealing edge 114 of the extension 112 of the channel 106 on the forward panel 34. This sealing engagement occurs when the rear panel 36 and the forward panel 34 are in the closed condition. The edge 136 of the channel 126 is substantially parallel to the edge 114 of the channel 106.

Referring now to FIGS. 10 and 11 there is illustrated the mounting means 80' on the rear panel 36. As noted above, the mounting means 80', 80'', 78', 78'', 78''' and 78'''' are all substantially identical in construction and are generally comprised of a wheel 140 which, for example, may be a ball bearing wheel in which the rim 142 rotates on the balls 144 that are contained between the rim 144 and an inner race 146. The inner race 146 is rigidly coupled to an axle means 148. The axle means 148 generally comprises a central shaft 150, a first roll pin 152 and a second roll pin 154. The shaft 150 extends from regions within an aperture 156 in the rigid block 88 to the wheel 140. The first roll pin 148 is force fit on the shaft 150 and extends from the wheel 140 a preselected distance into the aperture 156. The second roll pin 154 is provided with a slide fit on the first roll pin 152 and the external surface 154' thereof is force fit for a rigid non-rotating coupling in the aperture 156 of the rigid block 88. A spring means 156 extends between the head 150' of the shaft 150 and a washer 158 bearing against the rigidly held second roll pin 154. The spring means 156 provides the resilient mounting for the mounting means 80'. For the particular preferred structure illustrated in FIG. 10, the spring means 156 resiliently urges the shaft 150 in the direction indicated by the arrow 160 and resiliently resists movement of the wheel means 140 in the direction indicated by the arrow 162. Thus, the wheel means 140 is movable together with the shaft 150 and first roll pin 152 in the directions indicated by the arrow 160 and 162 to accommodate bowing or other non-parallel alignment of the side members 20 and 22 of the vehicle 12.

In operation, when it is desired to install the forward panel 34 and rear panel 36 on the vehicle 12, the mounting means 78 on the forward panel 34 are slid into the upper track 41 of the track means 26 and 30 from the open end 26' and 30' which is adjacent the tail gate 18 and then slid forward in the upper track 41 towards the cab 14. The spacing of the mounting means 78, as described above in connection with FIG. 7, prevents the mounting means 78 from passing into the transition slots 46 and 48 and thus prevents the forward panel 34 from being positioned in the lower track 43. The mounting means 80 of the rear panel 36 are then slid into the upper track 41 from the open end 26' and 30' of the track means 26 and 30 and pushed forward until the gasket 134 engages the sealing edge 114 on the forward panel 34. The tail gate may then be closed, slightly compressing the forward gasket 110 and rear gasket 128, to provide water tight sealing relationship. This provides the closed condition.

If it is desired to provide an open position, the rear panel 36 is pressed forwardly against the forward panel 34 compressing the cab gasket 110 and gasket 134 to a greater extent and allowing slight forward movement of the rear panel 36. The slight forward movement is sufficient to allow the forward wheel means 80' and rear wheel means 80" to enter the forward transition slot 48 and rear transition slot 46, respectively, either simultaneously or sequentially, depending on the relative spacing of the slots 46 and 48, with respect to the spacing of the wheel means 80' and 80". This allows the rear panel 36 to slide down the transition slots and be positioned in the lower track 43. In the lower track 43, the rear panel 36 may be slid forwardly as far as desired or until it is adjacent the rear wall 24 of the cab 14 where it is underneath the forward panel 34.

In order to prevent shock loading when the rear wheel means 80" encounter the edges 84" (FIG. 3) of guide block 84, it is preferred to place resilient bumpers 85 in the lower track 43. The bumpers 85 are spaced so that the forward edge 86 of the rear panel 36 engages the bumpers 85 before the rear wheel means 80" strikes edges 84". This position of rear panel 36 is the maximum forward position thereof and is the open condition.

To return the rear panel 36 to the upper track it is only necessary to move the rear panel towards the tail gate until the mounting means 80 engages the transition slots 46 and 48 and pull slightly upward on the lock means 38 to move the panel into the upper track 41 from the lower track 43. Thus, the transition slots 46 and 48 are spaced apart a cooperative distance with respect to the mounting means 80' and 80" on the rear panel 36 and the transition slots 46 and 48 are spaced a preselected distance from the end 26' adjacent the tail gate 18 of the track means 26. The preselected distance from the tail gate 18 is determined by the compressibility of cab gasket 110 and gasket 134.

Both the forward panel 34 and rear panel 36 may be quickly and easily removed from the track means 26 and 30 when desired by sliding them out of the upper track 41. Since this is generally a manual operation in both installation and removal, as well as moving of the forward panel 34 and rear panel 36, it is preferred that they be of the comparatively lightweight contruction as described above in connection with FIG. 8.

As noted above, it is often desirable to lock the rear panel 36 and/or the forward panel 34 in one or more positions. One position in which it is preferred to provide such locking is the closed condition as illustrated in FIGS. 1, 2, and 8. As shown on FIGS. 1 and 12, the lock means 38 provided on the rear panel 36 is a cam lock type fastener, such as that manufactured by Corbin Lock Company, and which may also be provided with a key lock for security purposes. The lock means 38 has a handle 180 extending above the upper skin 120 of the rear panel 36. It extends through the panel 36 to regions underneath the lower skin 122 thereof. The connecting portion 180' extending below the lower skin 122 is operatively connected to a first rod means 184 and a second rod means 186. As shown more clearly in FIGS. 8, 9 and 12, the portion 180' of the handle is pivotally connected to the first rod 184 and second rod 186 and upon rotation of the handle in the direction indicated by the arrow 190, which is the unlocking direction, and the arrow 192, which is the locking direction, the first rod means 184 and second rod means 186 are moved in the directions indicated by the double-ended arrows 194. A generally hat-shaped support 196 may be coupled to the lower skin 122 for supporting the rods 184 and 186 to guide them in proper alignment for locking. Locking is achieved by the extension of the rods 184 and 186 into apertures, such as aperture 198, FIG. 3, in the track means 26. Similar apertures are provided in the track means 30 for locking with the second rod 186.

As shown on FIG. 3, a plurality of locking apertures 198 may be provided in the track means 26 and track means 30 and a portion of the plurality of apertures 198 may be engaged by the first rod 184 and second rod 186. Thus, aperture 198' may be utilized for locking in the closed condition when the rear panel 36 is in the upper track 41. Other locking apertures 198" and 198''' may be utilized to lock the rear panel 26 in other positions when in the lower track 43.

For the closed condition, it is often desirable to lock the tail gate 18 in its closed condition. To achieve this, it is preferred to provide a clip means 200 coupled to the inside surface 18' of the tail gate 18 and the clip means 200 has an aperture 203 through which the first rod 184 passes in the locking condition. When the handle 180 is rotated in the direction indicated by the arrow 190, the rod 184 moves out of the aperture 198 and out of the aperture 203 to provide unlocking of the rear panel 36 and the tail gate 18. The structure for providing locking through the second rod 186 is similar to that described above.

Referring now to FIG. 13, there is shown a preferred locking arrangement 205 for the forward panel 34. As shown on FIG. 13, the channel means 106 on the rear edge 94 of the forward panel 34 in the extension portion 112 thereof is provided with walls 201 defining a guide aperture 202 therein. A slide bar 204 is resiliently mounted in the aperture 202 by a spring 206. The slide bar 204 has a tab portion 209 for manual gripping to move the slide bar 204 in the directions indicated by the double-ended arrow 208. A stop means 207 is coupled to the walls 201 in the aperture 202. The spring means 206 abuts against the slide bar 204 and resiliently urges the slide bar 204 to enter certain of the lock apertures 198, such as lock apertures 198a or 198b and thus retain the forward panel 34 in a locked position with respect to the first track means 26 and second track means 30. When it is desired to move the forward panel 34 the tab 209 is manually grasped and the slide bar 204 is moved inwardly to clear the lock aperture 198.

It will be appreciated that a similar lock bar arrangement 211 is provided adjacent the second track means 30. It is preferred that the tabs 209 on each lock bar arrangement 205 and 211 be spaced to allow simultaneous grasping thereof to actuate both lock bars at the same time for both locking and unlocking.

This concludes the description of the preferred embodiments of the present invention. As can be seen there has been provided a lightweight easily operable closure arrangement for pickup trucks and the like which may be easily installed as desired. Further, the closure arrangement provides a substantially planar surface when in the closed position to minimize wind drag and thereby increase gas mileage. Those skilled in the art may find many variatons and adaptations of thee present invention and the appended claims are intended to cover all such variations and adaptations falling within the true scope and spirit thereof.

I claim:

1. In combination:
   an open bed vehicle having a cab, a base coupled to said cab, a tail gate pivotally mounted on said base in spaced apart relationship to said cab, a first and a second upstanding, spaced apart side wall member each having a lower edge coupled to said base and a top edge spaced therefrom and said side wall members extending from said cab to said tail gate and defining a storage volume therewith;
   a first and a second substantially identical track means having walls defining an upper track, a lower track and transition slot means between said upper and lower tracks, and said first track means coupled to said first side member in spaced relationship to said base, and extending from regions adjacent said cab to regions adjacent said tail gate, and said second track means coupled to said second side member in parallel relationship with said first track means and in spaced relationship to said base and extending from regions adjacent said cab to regions adjacent said tail gate;
   a substantially planar, rectangular, forward panel extending laterally between said first and second track means, having mounting means removably and slideably mountable in said upper tracks of said first and said second track means, and said forward panel movable therein in a plurality of positions from regions adjacent said tail gate to a closed condition in regions adjacent said cab;
   restraining means for restraining said forward panel in said upper track for preventing transition of said mounting means on said forward panel therefrom through said transition slot means to said lower track;
   a substantially planar, rectangular rear panel extending laterally between said first and second track means and having mounting means removably and slideably mountable in said first and second track means and movable in a plurality of positions therein in said upper track from regions adjacent said tail gate in said closed condition through said transition slot means and into said lower track for positioning therein in an open condition in regions adjacent said cab and intermediate said forward panel and said base, and said forward panel and said rear panel substantially coplanar for said closed condition, and in said closed condition said forward panel and said rear panel together extending substantially continuously from said cab to said tail gate to cover said storage volume;
   lock means for locking at least one of said forward and said rear panels in at least one of said plurality of positions.

2. The arrangement defined in claim 1 wherein: each of said first and second track means comprises:
   a generally E-shaped member having a vertically disposed side portion, a top flange portion, a middle flange portion and a lower flange portion, and said top flange portion and said middle flange portion defining said upper track means, and said lower flange portion and said middle flange portion defining said lower track means, and said top flange portion having a first wall substantially parallel to said side portion and extending from said top flange a preselected distance towards said middle flange, said middle flange having a second wall substantially parallel to said side portion and extending upwardly towards said first wall and defining a first gap therewith, and said middle flange having a third wall extending from said middle flange towards said lower flange a preselected distance, and said lower flange having a fourth wall extending a preselected distance toward said third wall and defining a second gap portion therewith, and said upper flange having a first horizontally disposed portion extending over said top edge of said side member and a second horizontally disposed position extending a preselected distance over said base;
   said transition slot means in each of said first and second track means comprises walls defining a pair of apertures, comprising a forward aperture and a rear aperture spaced a first preselected distance apart and predetermined distances from said tail gate and extending through said middle flange, said second wall and said third wall of said track means and having a a preselected width, and a guide means in said lower track adjacent each of said spaced apart apertures for guiding transition of said mounting means of said rear panel between said upper track and said lower track;

said mounting means on said rear panel comprises a pair of forward wheel means resiliently coupled to said rear panel and a pair of rear wheel means resiliently coupled to said rear panel, and each of said forward wheel means and said rear wheel means having an axle having a first and a second end, and a wheel rotatably mounted on said first end of said axle, one of said forward pair of wheels and one of said rear pair of wheels mounted in each of said track means and said axles thereof extendable through said first and said second gap, and said forward pair of wheel means spaced a second preselected distance apart from said rear pair of wheel means for allowing transition of said rear panel from said upper track through said transition slot means to said lower track, and said resilient mounting of said wheel means resiliently resisting lateral movement of said mounting means with respect to said rear panel.

3. The arrangement defined in claim 2 wherein: said mounting means on said forward panel comprises:

a first and second pair of forward wheel means resiliently coupled to said forward panel, and each having an axle having a first end and a second end and a wheel rotatably mounted on said first end of said axle, and said wheels mounted in said upper track of said track means and said axle extendable through said first gap, and a first and a second pair of rear wheel means resiliently coupled to said forward panel, and each having an axle having a first end and a second end and a wheel rotatably mounted on said first end of said axle, and said wheels mounted in said upper track and said axles extending through said first gap, and said first pair of forward wheel means spaced from said second pair of forward wheel means a distance greater than said preselected width of said transition slot means, and said first pair of rear wheel means spaced from said second pair of rear wheel means a distance greater than said preselected width of said transition slot means, and said second pair of forward and rear wheel means on said forward panel comprises said means for restraining said forward panel in said upper track, and said resilient mounting of said wheel means on said forward panel resiliently resisting lateral movement of said mounting means with respect to said forward panel;

a resilient track gasket means on said first and said second horizontally disposed portions of said upper flange for providing water tight sealing relationship between said track means and said top edge of said side member and between said track means and said forward and rear panels.

4. The arrangement defined in claim 3 wherein each of said forward and rear panels further comprises:
a forward edge, a rear edge, and a pair of side edges;
an upper skin means;
a lower skin means;
a honeycomb structure means coupled to said upper and lower skin means and disposed in preselected postions therebetween;
rigid block means mounted in each corner between said upper skin means and said lower skin means and bonded thereto, and said second end of each of said axles resiliently mounted in said rigid block means;

a rigid channel means between said upper skin means and said lower skin means coupled thereto and extending around said forward edge, said rear edge, and said side edges;

said rear panel means having a rear gasket coupled to said channel means along said rear edge for water tight sealing relationship with said tail gate for the condition of said rear panel adjacent said tail gate;

said forward panel having a cab gasket coupled to said channel means along said forward edge for water tight sealing relationship with said cab for the condition of said forward panel adjacent said cab; and sealing means intermediate said forward edge of said rear panel and said rear edge of said forward panel for providing water tight sealing relationship therebetween for said forward panel and said rear panel in said closed condition; and said upper skin means of said forward and rear panels in water tight sealing relationship to said track gasket.

5. The arrangement defined in claim 4 wherein:
said sealing means comprises a gasket means retained in said channel means on said forward edge of said rear panel and said gasket means resiliently engaging said channel means on said rear edge of said forward panel.

6. The arrangement defined in claim 5 wherein: said lock means further comprises:

a cam lock means on said rear panel adjacent said rear edge thereof and having a handle means having a gripping portion extending through said upper skin means, and a connector portion extending below said lower skin, a first rod means operatively connected to said connector portion under said lower skin means and extending from said connector portion to said first track means, and a second rod means operatively connected to said connector portion under said lower skin means and extending from said connector portion to said second track means;

said first and second track means having walls defining a plurality of rod accepting lock apertures therein, a first portion of said plurality of lock apertures for receiving said first and said second rod means for the condition of locking said rear panel;

said tail gate comprises a clip means coupled thereto and having walls defining a rod receiving aperture therein for receiving one of said first and said second rod means therethrough for locking said tail gate for said rear panel adjacent thereto in said closed condition.

7. The arrangement defined in claim 6 wherein said lock means further comprises:
walls defining guide apertures in said channel means on said rear edge of said forward panel and adjacent said side members;
a first manually operable slide bar resiliently mounted in said guide apertures adjacent a first side edge of said forward panel, a second manually operable slide bar resiliently mounted in said guide aperture adjacent a second side edge of said forward panel, and said slide bars extendable into at least one of said lock apertures in said first and second track means for the condition of locking said forward panel in condition. closed condition 8. The arrangement defined in claim 7 wherein said first preselected distance is less than said second preselected distance, whereby said forward wheel means on said rear panel enters said forward aperture of said transition slot means slightly before said rear wheel means on said rear panel enters said rear aperture of said transition slot means.

9. The arrangement defined in claim 7 wherein said first preselected distance is substantially the same as said second preselected distance whereby said forward wheel means of said rear panel enters said forward aperture of said transition slot means substantially simultaneously with the rear wheel means entering said rear aperture of said transition slot means.

10. The arrangement defined in claim 7 wherein said first and said second slide bars are spaced to be substantially simultaneously operable; and further comprising:

resilient bumper means coupled to said track means in said lower track thereof adjacent said cab for engaging said forward edge of said rear panel before said rear wheels thereof engage said guide means of said forward aperture of said transition slot means for said panels in said open condition.

* * * * *